Patented Feb. 2, 1954

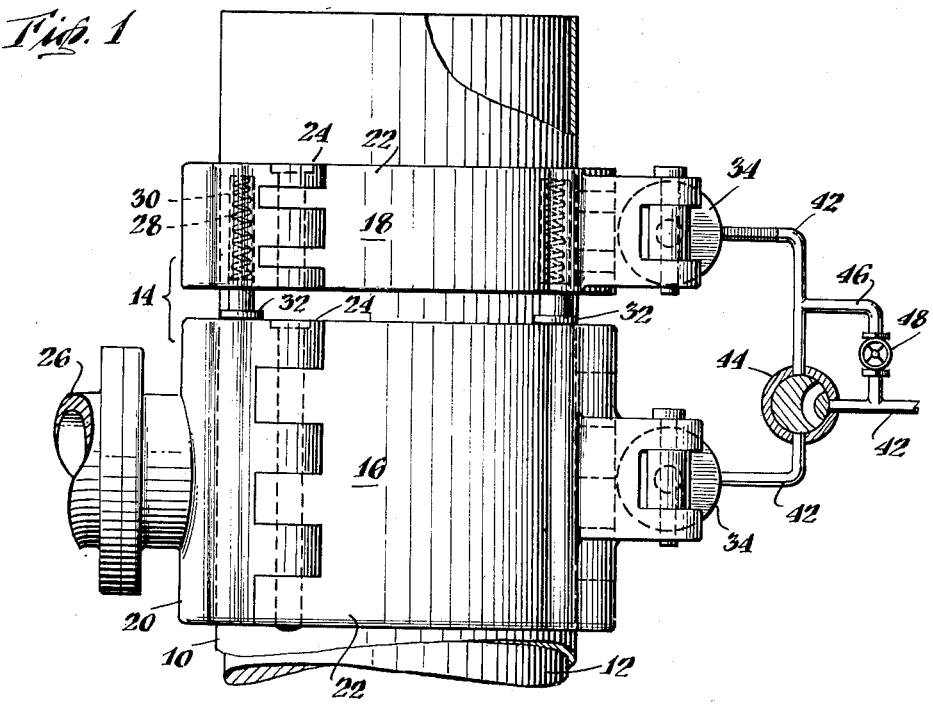
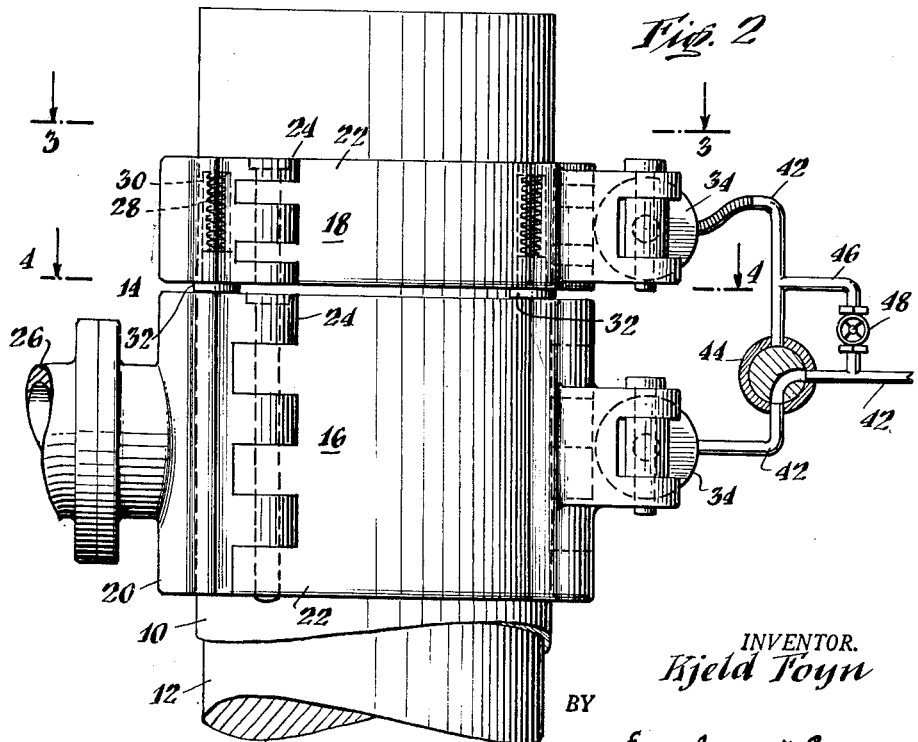

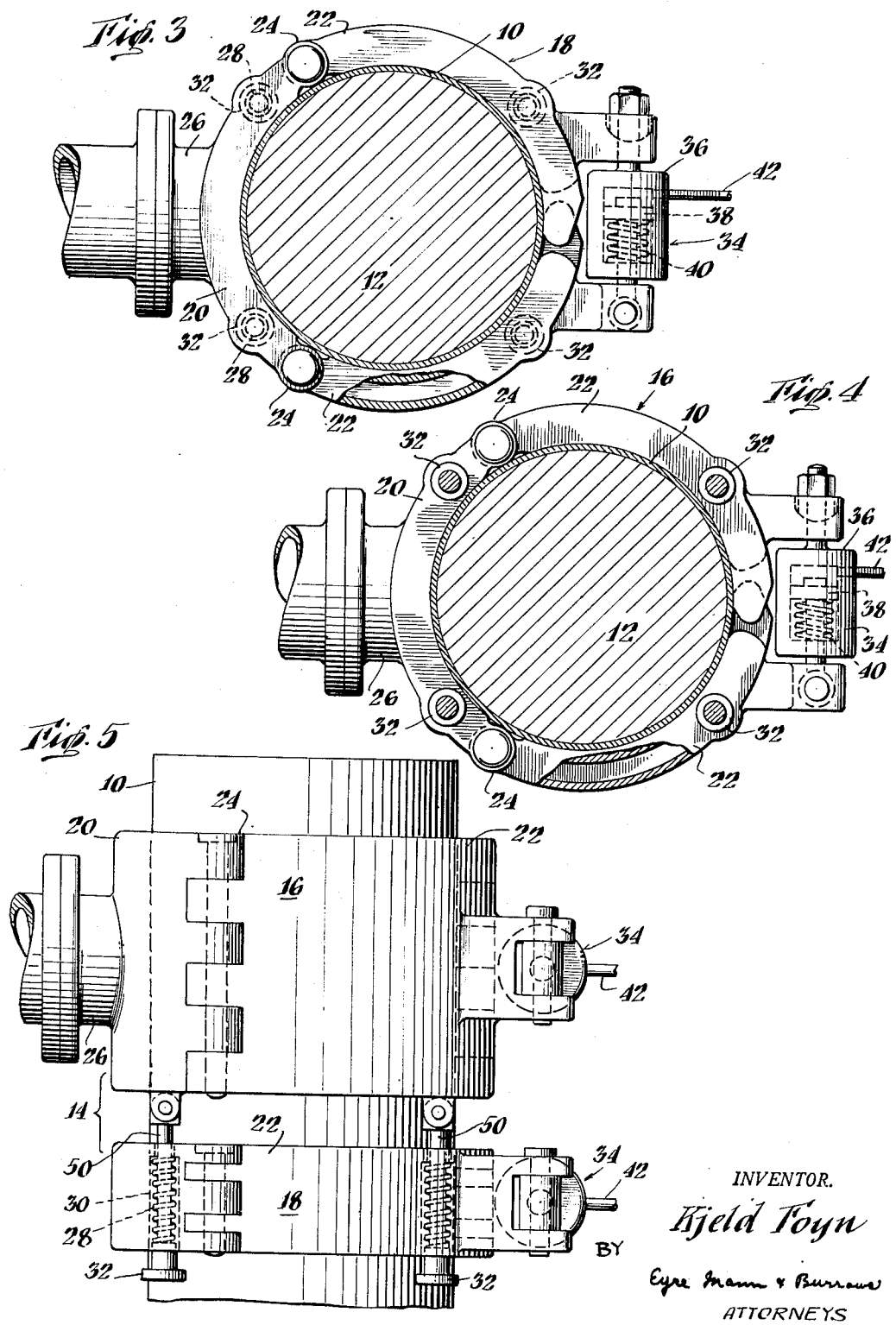

2,668,183

UNITED STATES PATENT OFFICE 2,668,183

ELECTRODE SUSPENSION MECHANISM AND METHOD OF OPERATION

Kjeld Foyn, Oslo, Norway, assignor to Elektrokemisk A/S, Oslo, Norway, a corporation of Norway Application September 11, 1951, Serial No. 246,062

Claims priority, application Norway September 13, 1950

8 Claims. (Cl. 13—16)

This invention relates to a suspension mechanism for electrodes used in smelting furnaces of the electric arc type which so controls the electrode that it may be lowered through its holder from time to time as necessary. My invention is of particular importance for the self-baking or Soderberg type of electrode but it is also useful with other types of electrodes such as the prebaked type.

In the usual suspension mechanism the electrode is held in a friction clamp which is moved to and from the bath as required for furnace operation. Since the electrode is gradually used up in the furnace it is necessary to release the clamp and slide the electrode down through it from time to time in order to keep the necessary length of electrode below the clamp. With the type of clamp presently in use it is extremely difficult to control electrode slippage and the displacement often amounts to between 12 to 20 inches or, as frequently happens, the electrode is damaged by bumping the charge or furnace bottom. This sudden displacement of the electrode is particularly objectionable for the self-baking or Soderberg type of electrode which requires uniform conditions in the furnace.

It is known that it is highly essential to bake the Soderberg electrode as evenly as possible and preferably to keep the baking zone within or above the clamp. This is only possible by frequent displacement of the electrode for a short distance at a time. The slippage must be so controlled that no unnecessary jerks or blows occur in the system which would mean a strain that might lead to electrode breakage.

To this end in my invention I provide an electrode holder comprising a main clamp with an auxiliary clamp which is normally held a short distance above it by vertical springs. Each clamp is preferably water-cooled and may be tightened around the electrode by any convenient means such as hydraulic, pneumatic or screw means but the important thing is that either clamp alone is capable of preventing electrode slippage. For this purpose I prefer however to provide each clamp with a horizontal spring so arranged that its pressure will always tend to tighten the clamp and prevent the electrode from slipping through it. The spring is adapted to be compressed by pneumatic pressure or the like so that the clamps may be opened by remote control.

The electrode is readily lowered through the holder by opening the main clamp. This allows the electrode to slide until the auxiliary clamp, which continues to grip the electrode, moves down to rest against the main clamp. The vertical springs between the clamps are compressed by this operation, making the slippage extremely even. The main holding clamp is then closed so that the auxiliary clamp may be opened and returned to its starting position by the pressure of the compressed vertical springs. This operation may be repeated as often as necessary to achieve the desired slippage.

I have found that in some applications my suspension mechanism can with advantage be modified by placing the auxiliary clamp below the main clamp. In such cases a stop, built into the main clamp, limits downward movement of the auxiliary clamp and the vertical springs cooperate with this stop to lift the auxiliary clamp up to its starting position after each slippage.

This invention can be readily understood by reference to the accompanying drawings in which Figs. 1 and 2 are front elevation views of my suspension mechanism; Fig. 3 is a top plan view taken on line 3—3 of Fig. 2; Fig. 4 is a similar view taken on line 4—4 of Fig. 3, and Fig. 5 illustrates the invention in a modified form.

In the preferred form of my invention shown, the numeral 10 indicates a casing for a Soderberg type of electrode 12, supported in a holder 14 which comprises a main friction clamp 16 and an auxiliary friction clamp 18. Each clamp has a fixed element 20 and two movable elements 22 hinged to the fixed element at 24. The elements are notched at each end to form dovetail joints as best shown in Fig. 1 and are preferably made hollow for water cooling (see Figs. 3 and 4). The fixed element 20 of main clamp 16 is attached to a pipe beam or box 26 which serves as a support for the clamps and which may also be used as a conduit for the water and electric supply (not shown). Pipe 26 moves the clamps and electrode to and from the bath as required for furnace operation. Vertical springs 28 built into recesses 30 of auxiliary clamp 18 bear against movable pedestals 32 to hold the clamps a short distance apart. Springs 28 are made strong enough to tension the clamps apart but they are not strong enough to support electrode 12.

In the example of my invention illustrated both clamps are tightened with spring bolts 34 which comprise a hollow casing 36 (see Fig. 3) attached to one movable element 22 and a piston 38 which is attached to the second movable element 22. The pressure of spring 40 always tends to tighten bolt 34 and close the clamp around electrode 12. Spring 40 is made strong enough so that if either clamp is closed, the electrode is held in a set position in holder 14. Control of spring bolts 34 for opening the clamps to lower electrode 12 through holder 14 is preferably accomplished by means of fluid pressure supplied by a suitable liquid or air to casing 36 above piston 38 by pipe 42 and valve 44. This valve is so constructed that it can only bring one spring casing under pressure at a time, never both at the same time, as in that case the electrode would immediately drop to the furnace bottom. A bypass 46 with a separate valve 48 is provided so that both clamps may be opened for special reasons as for example when replacing the electrode. When valve 44 is opened, compressed air is let into one of the spring casings 36 and piston 38 is moved outwards. This compresses spring 40 and when clamp pressure on the electrode has been sufficiently reduced, the electrode is free to slide through the clamp. When valve 44 is closed, the air pressure is dissipated and spring 40 again tightens this clamp around the electrode.

The cycle of operations for lowering the electrode is as follows: In Fig. 1 clamps 16 and 18 are in the starting position and both clamps are gripping electrode 12. Compressed air is admitted to main clamp 16 by opening valve 44 which allows the electrode to slide down and compress springs 28 until auxiliary clamp 18 rests against the base of pedestals 32 (see Fig. 2). In the starting position I prefer to hold the clamps between .8 and 2.4 inches apart so that the electrode will only slide down a small distance and preferably not over 4 inches. Main clamp 16 is now closed to take over the suspension so that auxiliary clamp 18 may be opened and returned to its starting position by springs 28. The auxiliary clamp is then closed and the cycle of operations may be repeated as often as desired.

The suspension mechanism shown in Fig. 5 is similar to that shown in Figs. 1 to 4 except that here the clamps are reversed and auxiliary clamp 18 is suspended below main clamp 16. This is readily accomplished by suspending pedestals 32 below the main clamp on rods 50. Since elements 22 move slightly when the clamps are released, pedestals 32 should not be rigidly held by rods 50. This slight movement may be taken care of by flexible couplings for rods 50 or by providing oversized holes in auxiliary clamp 18 as shown in Fig. 5. The cycle of operations for lowering the electrode is the same as described above. When main clamp 16 is opened, auxiliary clamp 18 slides down with the electrode until it rests against the base of pedestals 32. The main clamp is then closed and the auxiliary clamp opened and returned to its starting position by springs 28.

Although this invention has been illustrated in connection with a round electrode, it is obvious that my suspension mechanism may be used with different shapes and type of electrodes, for example, square, oblong or oval electrodes, both prebaked and continuous, may be used.

The electric current is generally supplied only to main clamp 16 but the auxiliary clamp 18 may also be connected with the electric supply. This gives a better flow of electricity for the electrode when it is lowered through the holder.

It will be understood that it is intended to cover all changes and modifications of the preferred embodiment of the invention herein chosen for the purpose of illustration which do not constitute departures from the spirit and scope of my invention.

The invention is not limited to remote controlled lowering of the electrode through the described type of electrode holder, but includes also other types of holders. Thus, for example, an electrode holder consisting of clamps surrounded by a pressure ring according to known constructions may be combined with an auxiliary clamp as described above. Further it is not necessary that the auxiliary clamp be connected with the electrode casing by being pressed against its periphery. The auxiliary clamp may be attached in other ways, for example by being pressed against the upper end of the electrode casing or its ribs. The auxiliary clamp would then be placed at the upper end of the electrode casing and would register with a permanent mantle or the like, surrounding the electrode above the holder and connected with said holder.

What I claim is:

1. An electrode suspension mechanism for an electric furnace comprising a main and an auxiliary holding clamp for the electrode positioned a short distance apart each of said clamps being capable of holding the entire weight of the electrode, means for opening the separate clamps whereby the electrode and auxiliary clamp may be lowered until said auxiliary clamp is stopped by the main clamp, and means for returning the auxiliary clamp to its starting position when the main clamp is closed and the auxiliary clamp opened.

2. An electrode suspension mechanism for an electric furnace comprising a main and an auxiliary holding clamp for the electrode positioned a short distance apart each of said clamps being capable of holding the entire weight of the electrode, means for opening the separate clamps adapted to hold one clamp closed when the second clamp is open whereby the electrode and auxiliary clamp may be lowered until said auxiliary clamp is stopped by the main clamp, and spring means adapted to return the auxiliary clamp to its starting position when the main clamp is closed and the auxiliary clamp opened.

3. A structure as specified in claim 2 in which the auxiliary clamp is positioned below said main clamp.

4. An electrode suspension mechanism for an electric furnace comprising a main clamp and an auxiliary clamp positioned above said main clamp, a spring in each of said clamps adapted to tighten the clamp by spring pressure to hold the electrode each of said clamps being capable of holding the entire weight of the electrode, means for compressing the separate springs adapted to hold one clamp closed when the second clamp is open to insure positive support of the electrode at all times whereby the electrode and auxiliary clamp may be lowered until said auxiliary clamp is stopped by the main clamp, vertical springs positioned between said clamps adapted to return the auxiliary clamp to its starting position when the main clamp is closed and the auxiliary clamp open.

5. A structure as specified in claim 4 including means for supplying fluid pressure to said springs for opening the separate clamps.

6. An electrode suspension mechanism for an electric furnace comprising a main and an auxiliary holding clamp for the electrode positioned a short distance apart each of said clamps being capable of holding the entire weight of the electrode, means for opening the separate clamps whereby the electrode and auxiliary clamp may be lowered, means for limiting downward movement of said auxiliary clamp, and spring means adapted to return the auxiliary clamp to its starting position when the main clamp is closed and the auxiliary clamp opened.

7. A structure as specified in claim 1 in which the clamps are positioned approximately ½ to 2 inches apart.

8. The method of operating an electrode suspension mechanism for an electric furnace, which mechanism is of a type comprising a main holder clamp and an auxiliary holder clamp for the electrode normally positioned a short distance above the main clamp and including spring means tending to push said clamps apart and each of said clamps being capable of holding the entire weight of the electrode, which comprises the steps of releasing the grip of the main clamp while supporting the electrode with the auxiliary clamp, permitting the electrode and auxiliary clamp to move downwardly under the force of gravity until said spring means is compressed and the auxiliary clamp is stopped by the main clamp, reclamping the main clamp to the electrode, releasing the grip of the auxiliary clamp and permitting said auxiliary clamp to rise relative to the electrode and the main clamp under the influence of said spring means and then reclamping the auxiliary clamp to the electrode while the auxiliary clamp and the main clamp are in spaced relationship.

KJELD FOYN.

References Cited in the file of this patent

UNITED STATES PATENTS

| Number | Name | Date |
| --- | --- | --- |
| 1,760,395 | Brock | May 27, 1930 |
| 1,889,282 | Franchini et al. | Nov. 29, 1932 |
| 1,892,109 | Marshall | Dec. 27, 1932 |
| 2,121,578 | Winter et al. | June 21, 1938 |
| 2,179,153 | Jones | Nov. 7, 1939 |
| 2,297,484 | Lehrer et al. | Sept. 29, 1942 |
| 2,580,518 | Conti | Jan. 1, 1952 |